(12) United States Patent
Tümler et al.

(10) Patent No.: US 10,821,831 B2
(45) Date of Patent: Nov. 3, 2020

(54) METHOD FOR INTERACTING WITH IMAGE CONTENTS DISPLAYED ON A DISPLAY DEVICE IN A TRANSPORTATION VEHICLE

(71) Applicant: VOLKSWAGEN AKTIENGESELLSCHAFT, Wolfsburg (DE)

(72) Inventors: Johannes Tümler, Wellen (DE); Carsten Temming, Braunschweig (DE); Helge Schäfer, Lehrte (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/326,387

(22) PCT Filed: Jul. 27, 2017

(86) PCT No.: PCT/EP2017/069072
§ 371 (c)(1),
(2) Date: Feb. 19, 2019

(87) PCT Pub. No.: WO2018/041489
PCT Pub. Date: Mar. 8, 2018

(65) Prior Publication Data
US 2019/0225084 A1 Jul. 25, 2019

(30) Foreign Application Priority Data
Sep. 1, 2016 (DE) .......................... 10 2016 216 577

(51) Int. Cl.
*B60K 37/06* (2006.01)
*G06F 3/01* (2006.01)
(Continued)

(52) U.S. Cl.
CPC .............. *B60K 37/06* (2013.01); *B60K 35/00* (2013.01); *G06F 3/016* (2013.01); *G06F 3/017* (2013.01);
(Continued)

(58) Field of Classification Search
CPC ... G06T 19/006; G06F 3/04815; B60K 37/06; B60K 2370/1531; B60K 2370/31; G02B 2027/0134
See application file for complete search history.

(56) References Cited

U.S. PATENT DOCUMENTS

2008/0130126 A1* 6/2008 Brooks .................. G02B 30/27
359/619
2011/0242102 A1* 10/2011 Hess ...................... B60K 35/00
345/419
(Continued)

FOREIGN PATENT DOCUMENTS

DE 102011078127 A1 8/2012
DE 102011112563 A1 3/2013
(Continued)

OTHER PUBLICATIONS

Written opinion for International Patent Application No. PCT/EP2017/069072, form PCT/ISA/237, dated Nov. 24, 2017, original and translation, 11 pages. (Year: 2017).*
(Continued)

Primary Examiner — Jeffery A Brier
(74) Attorney, Agent, or Firm — Barnes & Thornburg LLP

(57) ABSTRACT

Image contents are displayed with a spatial impression of depth for interaction with image contents displayed on a display device in a transportation vehicle, the image contents having control elements in more than one depth plane. An operating action by a user is detected by at least one
(Continued)

sensor provided in the transportation vehicle, and it is determined in which depth plane an operating element should be operated. An interaction with a displayed operating element takes place in the determined depth plane according to the detected operating action. A touch screen is provided for the operating action of the user wherein the level of pressure exerted by the user is detected and the user interacts with operating elements in different depth planes based on the detected pressure level. Alternatively, a gesture sensor is provided for the operating action by the user.

20 Claims, 3 Drawing Sheets

(51) Int. Cl.
  *G06F 3/0488* (2013.01)
  *H04N 13/30* (2018.01)
  *B60K 35/00* (2006.01)
  *H04N 13/302* (2018.01)

(52) U.S. Cl.
  CPC ........... *G06F 3/0488* (2013.01); *H04N 13/30* (2018.05); *H04N 13/302* (2018.05); *B60K 2370/126* (2019.05); *B60K 2370/1531* (2019.05); *B60K 2370/29* (2019.05); *B60K 2370/31* (2019.05); *B60K 2370/334* (2019.05)

(56) References Cited

U.S. PATENT DOCUMENTS

| | | |
|---|---|---|
| 2012/0120066 A1 | 5/2012 | Hirota |
| 2013/0285970 A1 | 10/2013 | Ahn et al. |
| 2014/0282278 A1* | 9/2014 | Anderson ........... G06F 3/04883 715/863 |
| 2015/0363070 A1 | 12/2015 | Katz |

FOREIGN PATENT DOCUMENTS

| | | | |
|---|---|---|---|
| EP | 1798588 A1 | 6/2007 | |
| EP | 2896531 A2 | 7/2015 | |
| GB | 2517793 A | 3/2015 | |
| WO | 2013001084 A1 | 1/2013 | |
| WO | 2013015466 A1 | 1/2013 | |
| WO | WO-2013099681 A1 * | 7/2013 | ......... G06F 3/04817 |
| WO | 2014108147 A1 | 7/2014 | |
| WO | 2014198552 A1 | 12/2014 | |
| WO | 2015062751 A1 | 5/2015 | |
| WO | 2015162058 A1 | 10/2015 | |

OTHER PUBLICATIONS

Written opinion for International Patent Application No. PCT/EP2017/069072, form PCT/ISA/373, dated Mar. 5, 2019, original and translation, 13 pages. (Year: 2019).*

Search Report for German Patent Application No. 10 2016 216 577.1; dated Aug. 11, 2017.

Search Report for International Patent Application No. PCT/EP2017/069072; dated Nov. 24, 2017.

* cited by examiner

METHOD FOR INTERACTING WITH IMAGE CONTENTS DISPLAYED ON A DISPLAY DEVICE IN A TRANSPORTATION VEHICLE

PRIORITY CLAIM

This patent application is a U.S. National Phase of International Patent Application No. PCT/EP2017/069072, filed 27 Jul. 2017, which claims priority to German Patent Application No. 10 2016 216 577.1, filed 1 Sep. 2016, the disclosures of which are incorporated herein by reference in their entireties.

SUMMARY

Illustrative embodiments relate to a method for interacting with image contents that are displayed on a display device in a transportation vehicle and to a device for implementing the method.

BRIEF DESCRIPTION OF THE DRAWINGS

Additional features of the disclosed embodiments will become apparent from the following description and the claims in conjunction with the figures, in which:

DETAILED DESCRIPTION

Figure 1:
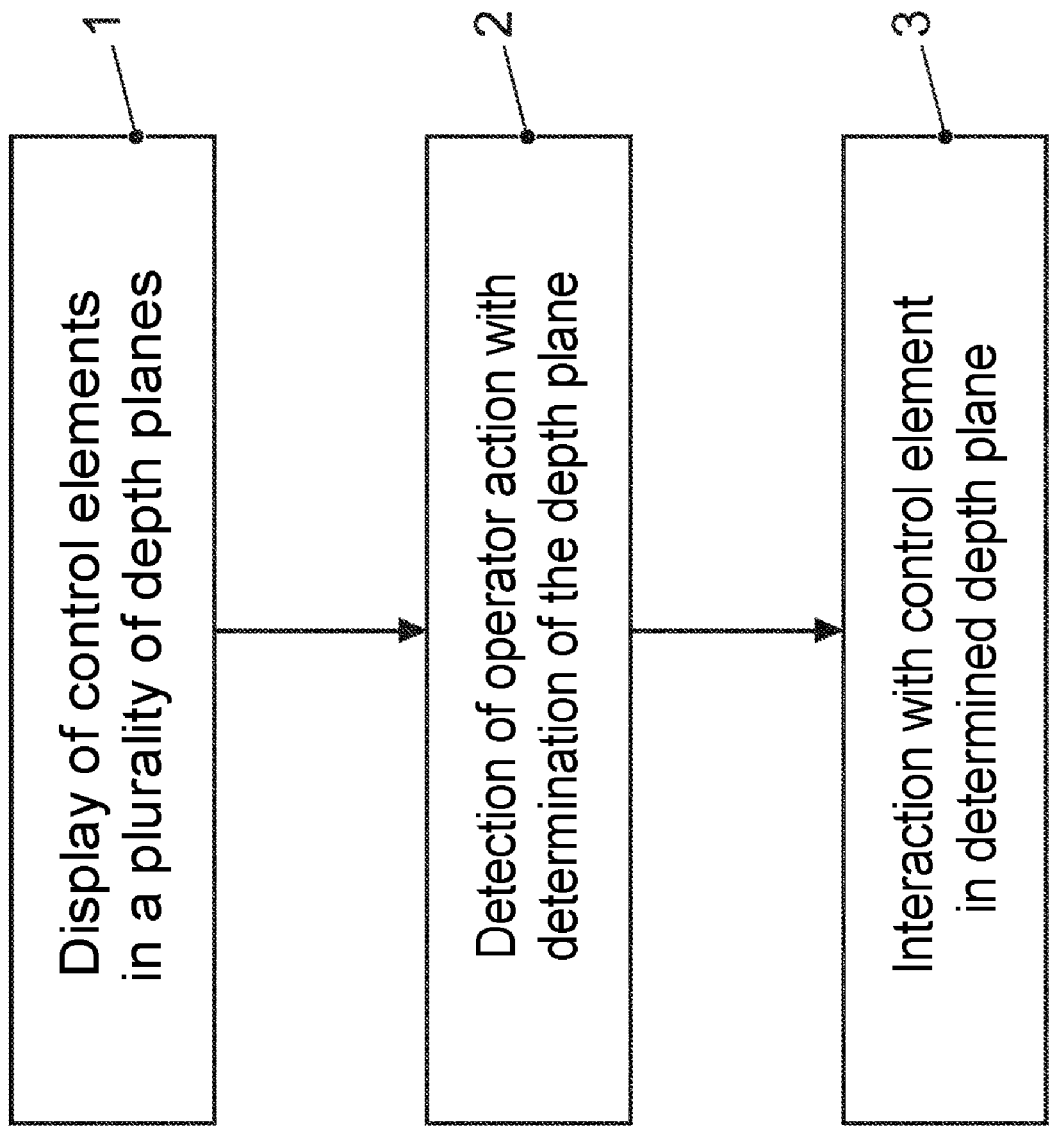
FIG. 1 shows a schematic view of the disclosed method for interacting with image contents displayed on a display device in a transportation vehicle.

A current trend in display technology is "stereo 3D capability", in which the viewer receives a slightly different image in each eye to give an impression of a spatial depth of the image. In this technology, in the so-called Static 3D (S3D) there is an ideal viewing point for the best stereo impression, while other methods allow multiple ideal viewing points (Multiview 3D) or even in the context of light field technology a large number of (ideally infinitely many) viewing points for a stereoscopic display.

Various 3D display technologies can be used. Thus, in auto-stereoscopic displays, to create a three-dimensional impression, two images are shown at the same time, wherein by lenticular grids or parallax barriers the light of individual pixels is deflected in different directions in front of the screen and a different image appears on each of the two eyes. Other display types can also be used to create a depth impression, such as multi-layer displays, in which a plurality of display planes are arranged on top of each other, or light field displays, in which a micro-lenticular grid is used to enable an image to be divided into individual beams of light and to be focused at different depths.

In transportation vehicle technology, displays are being increasingly used for fully digital instrument clusters or multifunction displays arranged in the central console. Currently, for example, a two-dimensional display of circular instruments is produced, such as the speedometer or tachometer, indicators for outside temperature, time of day, mileage and warning and information symbols, but also for additional functions in the infotainment area, such as navigation or telephone. It can be assumed, however, that in the future 3D displays will also be used here, because the perceived depth of the image then allows visual information to be displayed distributed in space. The use of an auto-stereoscopic display for a three-dimensional display of a transportation vehicle instrument panel is described in GB 2517793 A, wherein the presented information is prioritized in a form such that important information to the driver is displayed in the foreground and functions less important to the driver are displayed in the background.

3D displays, which could be used not only for pure information display but also for operating equipment in the transportation vehicle, would enable new operating concepts for the user by displaying control elements at different depths. However, this would require an interaction with the control elements, which are displayed at varying distances away from the viewer.

Disclosed embodiments provide a method or mechanism for interacting with control elements, which are displayed on a 3D display at different depths.

Disclosed embodiments provide a method and by a corresponding device.

The disclosed method for interacting with image contents that are displayed on a display device in a transportation vehicle is characterized by the following operations:

displaying image contents with a spatial impression of depth, wherein the image contents comprise control elements that are displayed in more than one depth plane;

detecting an operator action of a user by at least one sensor provided in the transportation vehicle, wherein the depth plane in which a control element should be operated is determined;

interaction with a displayed control element shown in the determined depth plane in accordance with the detected operator action.

According to a first disclosed embodiment, a touch screen is provided for the user's operator action. In this case, the pressure level exerted by the user is detected, and as a function of the detected pressure level an interaction takes place with control elements in different depth planes.

The use of a touch screen has the benefit that it is a device with which users are generally already familiar. Only the dependence on the pressure exerted by the user when touching the touch screen is new to them and can thus be easily learned.

According to an extension of this first disclosed embodiment, the display device itself is implemented as a touch screen. This enables an intuitive operation by the user, as the control elements can be operated using the touch screen at the place where they are also displayed.

According to a second disclosed embodiment, a gesture sensor is used for the operator actions of the user. In this case at least one virtual surface is provided in the transportation vehicle interior, which is used to distinguish between the different depth planes by detecting whether all or a part of the user's hand is located in front of or behind this virtual surface.

The use of a gesture sensor has the benefit that not only can an operation be carried out in a contactless manner, but also that different control gestures (such as, for example, switching on and off, rotating a control knob to the left or right, or moving a displayed slider) can be used and detected.

According to an extension of this second disclosed embodiment, a stereoscopic display is provided as a display device, to which a virtual surface is assigned in the 2-D zero plane of the stereoscopic display. In this case, on detection of all or part of the user's hand between this virtual surface and the surface of the stereoscopic display an interaction takes place with a control element appearing behind the surface of the stereoscopic display, and on detection of all or part of the user's hand in the spatial region in front of this virtual surface an interaction takes place with a control element appearing in front of the surface of the stereoscopic display.

According to a third disclosed embodiment, control elements are provided on the steering wheel for the operator action of the user. This enables the user to operate the control elements without having to take a hand off the steering wheel.

According to a fourth disclosed embodiment, both a touch screen and a gesture sensor are provided for the operator action of the user, wherein one part of the operator action is performed using the touch screen and another part by the gesture sensor. This can be beneficial for complex control operations.

The operability for the user can be further simplified by a visual and/or haptic feedback, which signals the current depth plane and, if applicable, the current position within the depth plane.

For a better understanding of the principles of the present disclosure, embodiments are described in more detail below by reference to the figures. It goes without saying that the disclosure is not limited to these embodiments and that the described features can also be combined or modified without departing from the scope of protection of the disclosure, as it is defined in the claims.

FIG. 1 shows a schematic view of a method for interacting with image contents displayed on a display device in a transportation vehicle. The display device in this case is a 3-D display, on which in a first operation at 1, image contents are displayed with a spatial impression of depth. The image contents in this case comprise control elements that are displayed in more than one depth plane. In a second operation at 2 an operator action of a user is detected by at least one sensor provided in the transportation vehicle. This involves determining the depth plane in which a control element should be operated and, if a plurality of control elements are available in the determined depth plane, with which of these control elements an interaction should take place. In a third operation at 3, an interaction is then carried out with the identified control element in the determined depth plane in accordance with the detected operator action.

According to a first disclosed embodiment, an interaction is carried out with the control elements using a touch-sensitive flat screen, also known as a touch screen. When using such a touch screen, by tapping with a finger on parts of a displayed image a technical device can be controlled. In the touch screens known from the prior art however, spatial interaction with 3D content is not possible, because an operation takes place on the two-dimensional surface of the touch screen, and hence not at the spatial coordinates of the visually perceived 3D object.

According to the disclosed embodiments, a spatial interaction with 3D content is now enabled, allowing the user to interact with different depth planes as a function of the pressure exerted by him/her on the display surface. The pressure level can be determined, for example, by evaluating the surface area that the finger occupies on the touch screen (small area: at the front; large area: at the rear). Similarly, the level of pressure applied can also be carried out by measuring capacitance changes due to a change in the spacing between different layers of the display. In the case of a pseudo-stereo 2-layer display, for example, when using slight pressure it is possible to interact with the first plane, and using strong pressure to interact with the second plane. In the case of other display technologies, a smooth transition between more than 2 depth planes in the three-dimensional space is also possible by constantly increasing/decreasing the pressure level or the area of the finger on the touch screen. Instead of or in addition to the determination of the pressure level, the duration of the contact with the touch screen can also be evaluated. A visual feedback (e.g., as a pointer) at the corresponding depth increases the controllability of the interaction. Also, a haptic feedback using a display vibration is also possible.

Figure 2:
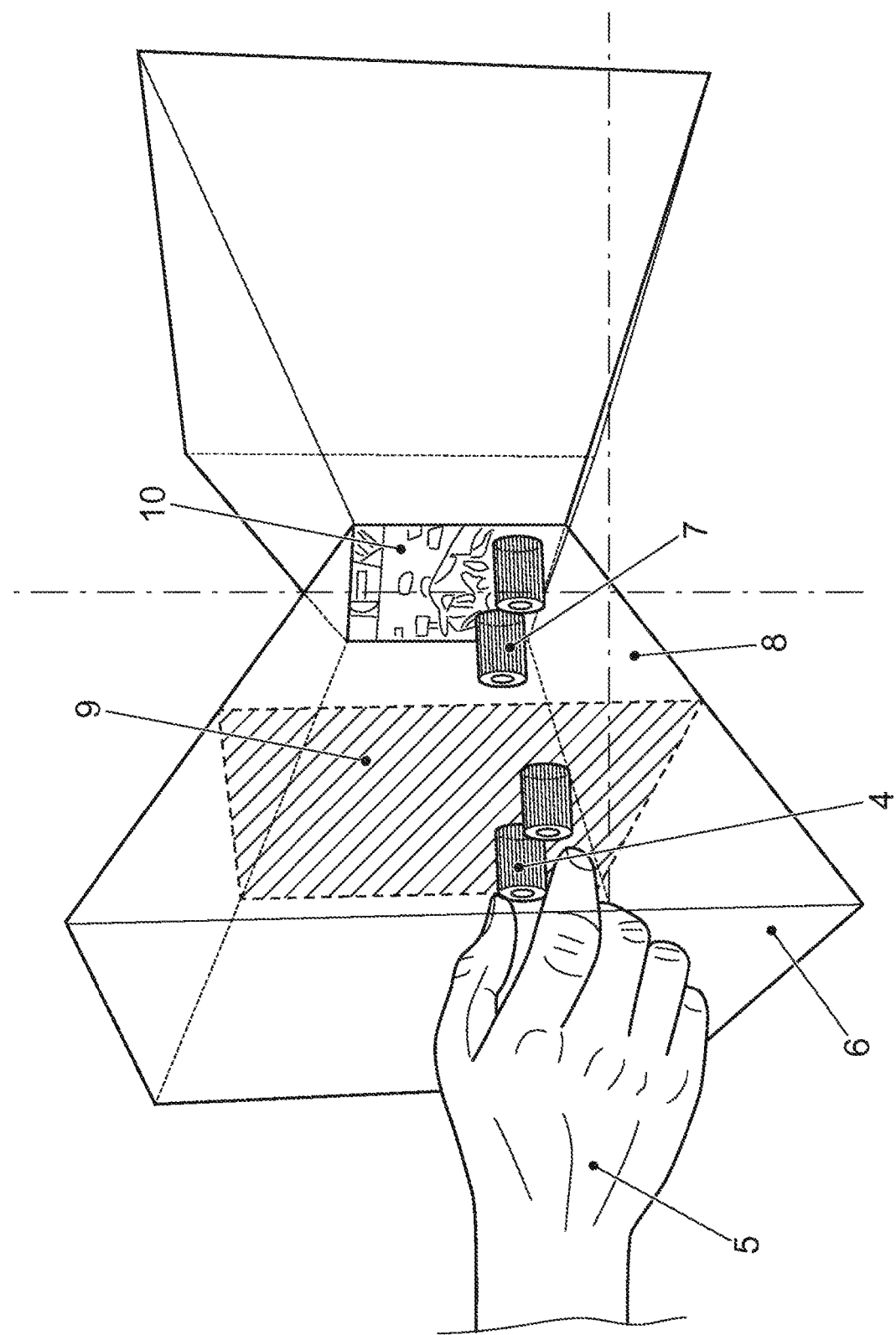
FIG. 2 shows a schematic view of the differentiation of the depth plane in front of the display device for the operator action of the user by a gesture.

According to a second disclosed embodiment, an interaction takes place with the control elements by a gesture sensor arranged in the transportation vehicle. In this case, as shown schematically in FIG. 2, a virtual surface 9 is provided in the interior of the transportation vehicle in front of the display 10, which is used to distinguish between two different depth planes. This is made possible by using the gesture sensor to detect whether all or a part of the user's hand 5 is located in front of or behind this virtual surface 9. For example, in the case of a stereoscopic display this virtual surface can be assigned to the 2-D zero plane of the stereoscopic display. Upon detection of the hand or the part of the user's hand 5 in the spatial region 8 between this virtual surface and the surface of the stereoscopic display, an interaction can take place with a control element appearing behind the surface of the stereoscopic display. Upon detection of all or part of the user's hand in the spatial region 6 in front of this virtual surface, an interaction takes place with a control element appearing in front of the surface of the stereoscopic display instead. In the illustrated example, two controls appear as if they are protruding out of the display. The operation of the controller 7 shown on the left is therefore carried out in the space in front of the virtual surface 9 at position 4.

Figure 3:
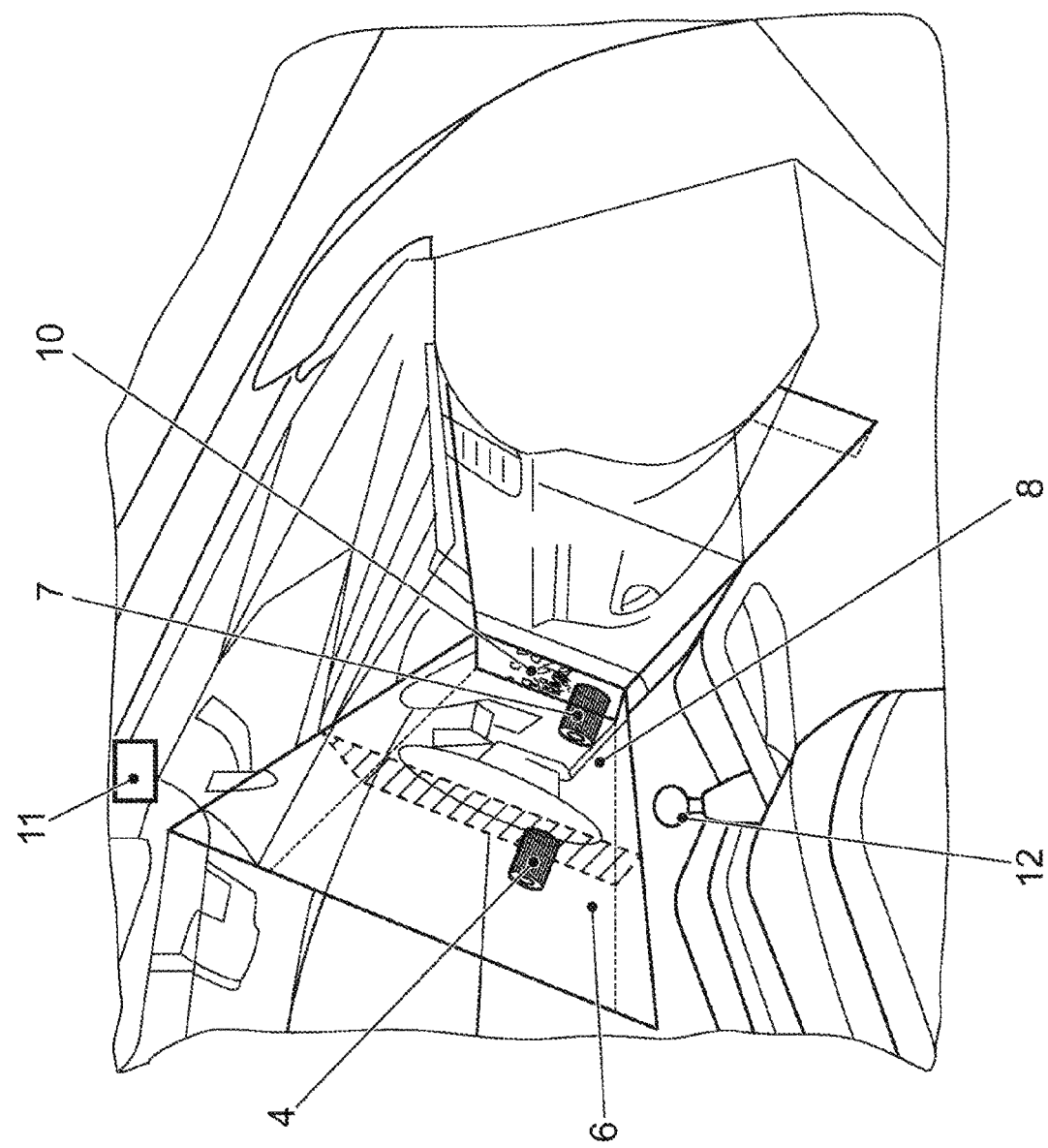
FIG. 3 shows the arrangement in the interior of the transportation vehicle for the exemplary embodiment of FIG. 2.

FIG. 3 shows a schematic representation of a portion of the interior of the transportation vehicle during the use of this disclosed embodiment. In this case, the virtual surface is located at approximately the same height as the gear selector lever 12. A gesture sensor 11 in this example is fitted on the roof liner in the region of the rear-view mirror, but it can also be arranged on the dashboard or central console. A plurality of gesture sensors can also be provided if necessary.

The gesture sensor 11 can detect the position of the hand or finger of the driver, for example, using a camera. To do this, illumination, for example, with infrared light can also be used. In this case, a 3D camera system, in particular, a TOF camera (Time Of Flight) may be used, with which distances to the individual pixels of the image can be determined. It is thus possible to generate three-dimensional image data and thus to be able to differentiate between parts of the hand, such as individual fingers of the hand, and to determine their position in space.

The camera-generated image or video data is first pre-processed in a video processing unit and then passed to an image analysis unit. After this, upon detection of a hand or individual finger of the driver the gesture is then recognized, wherein different predefined control gestures may be provided, and it is then necessary to determine which of these predefined control gestures is present. To this end, a comparison can be performed with the different control gestures provided in a database, wherein either a comparison of the image data of the recorded hand or finger configuration can be made directly with corresponding representations in the database, or an abstraction can be made first using a hand or finger model to then perform a comparison. The finger position of multiple fingers relative to each other can also be detected and evaluated. It can also be provided that the gesture recognition is only enabled if the user's hand is in a predefined area in front of the 3-D display. In the case of multiple control elements in the same depth plane, from the position of the hand or the fingers of the hand relative to the display surface it is possible to determine which of the control elements should be operated. If both the control gestures and the control element to be operated have been determined, as a function of these an operation of a device in the transportation vehicle, such as the navigation device, telephone or radio, can then be performed. The operation can then be terminated, for example, using the gesture recognition by the hand of the user being removed from the predefined region in front of the 3-D display.

It is also possible to make controls or even a complete interaction plane visible only when an approach of the hand is detected by the gesture sensor, or to spatially displace their graphical representation in the depth dimension. This enables a portion of the displayed information to remain in the background while the control elements are moved further forward. If it is detected using the gesture sensor that the hand has disappeared again from the interaction region, then the control elements or the interaction plane are hidden again, or the spatial displacement is undone, so that the image is again displayed at the display position at the original depth.

A visual feedback for the user, which illustrates the depth plane in which an operator action of the user is currently being detected, can increase the controllability of the interaction. This can be carried out in the various disclosed embodiments, e.g., as a point or pointer displayed at the current position at the appropriate depth. In the case of the gesture recognition a schematic display of a hand, if possible with the detected finger positions, can also be implemented. Even if during the gesture recognition the user, in contrast to the operation by touch screens, has no physical contact with the display surface, a haptic feedback is possible instead of or in addition to a visual feedback. To this end, by an ultrasonic transmitter, small but noticeable vibrations can be generated in the air, which can be used to sense geometries in the space.

The interaction by a gesture sensor is not limited to two depth planes, but instead control elements can also be arranged in more than two interaction planes. To this end the region in front of the 3-D display is divided into a plurality of subregions, wherein the gesture sensor is used to detect in which subregion the hand or the hand part 5 of the user is located.

According to a further disclosed embodiment, an interaction with the control elements can take place using control elements on the steering wheel. Thus, for example, a 3-D cursor can be controlled using steering wheel buttons or steering wheel touch-surfaces, wherein the current operating position is displayed. In this case, for example, the position in the X-Y plane can be controlled with a directional pad and the depth position in the Z-direction can be adjusted by a slider control. Also, for example, it is possible to toggle through the control elements of a plane and to switch through the planes by pressure on a slider control or knob. This can then be accompanied by a visual highlighting of the active plane.

Finally, a combination of the above operating modalities can also be provided. For example, an operator action can be started with an activation of the touch screen and then continued using a gesture in the space in front of the display device. It is also conceivable to first start the operator action with a gesture and then continue it using the touch screen.

LIST OF REFERENCE NUMERALS

1 First method operation with display of the control elements in a plurality of depth planes
2 Second method operation with detection of the operator action and with determination of the depth plane
3 Third method operation with interaction with control element in the determined depth plane
4 Operating position of a displayed controller
5 Hand of the user
6 spatial region, in which control elements appearing in front of the display surface can be interacted with
7 Display position of a displayed controller
8 spatial region, in which control elements appearing behind the display surface can be interacted with
9 virtual plane corresponding to the zero plane of the display
10 display
11 gesture sensor
12 gear selection lever

The invention claimed is:

1. A method for interacting with image contents displayed on a display device in a transportation vehicle, the method comprising:
    displaying image contents with a spatial impression of depth by at least two depth planes, wherein the image contents comprise control elements each associated with operation control, wherein at least one control element is displayed and enabled for user interface to provide the associated operation control within each of the at least two depth planes;
    detecting an operator action of a user by at least one sensor provided in the transportation vehicle;
    determining, based on the detected operator action, which of the at least two depth planes corresponds to the operator action; and
    adjusting, within the determined depth plane, the associated operational control of a corresponding one of the displayed control elements shown based on the detected operator action.

2. The method of claim 1, wherein a touch screen is provided for the operator action of the user and the pressure level exerted by the user on the touch screen is detected, wherein an interaction takes place with controls in different depth planes as a function of the detected pressure level.

3. The method of claim 2, wherein the display device is implemented as a touch screen.

4. The method of claim 1, wherein a gesture sensor is provided for the operator action of the user and at least one virtual surface, which is used to distinguish between the different depth planes, is provided in the transportation vehicle interior, wherein the gesture sensor is used to detect whether all or a part of the user's hand is located in front of or behind the virtual surface.

5. The method of claim 4, wherein a stereoscopic display is provided as the display device, to which the virtual surface is assigned in the case of the 2-D zero plane of the stereoscopic display, wherein an interaction takes place with a control element appearing behind the surface of the stereoscopic display in response to detection of all or part of the user's hand in the spatial region between the virtual surface and the surface of the stereoscopic display, and an interaction takes place with a control element appearing in front of the surface of the stereoscopic display in response to detection of all or part of the user's hand in the spatial region in front of the virtual surface.

6. The method of claim 1, wherein control elements are provided on the steering wheel for the operator action of the user.

7. The method of claim 1, wherein both a touch screen and a gesture sensor are provided for the operator action of the user, wherein one part of the operator action is performed using the touch screen and another part is performed by the gesture sensor.

8. The method of claim 1, wherein a visual and/or haptic feedback signals the current depth plane and the current position within the depth plane.

9. The method of claim 1, wherein the image contents comprises three-dimensional control elements for user interaction to adjust the associated operation control.

10. A device for carrying out a method for interacting with image contents displayed on a display device in a transportation vehicle, the method comprising:
displaying image contents with a spatial impression of depth by at least two depth planes, wherein the image contents comprise control elements each associated with an operation control wherein at least one control element is displayed for user interaction within each of the at least two depth planes;
detecting an operator action of a user by at least one sensor provided in the transportation vehicle;
determining, based on the detected operator action, which of the at least two depth planes corresponds to the operator action; and
adjusting, based on the detected operator action, the associated operational control of a corresponding one of the displayed control elements which remains within the determined depth plane.

11. The device of claim 10, wherein a touch screen is provided for the operator action of the user and the pressure level exerted by the user on the touch screen is detected, wherein an interaction takes place with controls in different depth planes as a function of the detected pressure level.

12. The device of claim 11, wherein the display device is implemented as a touch screen.

13. The device of claim 10, wherein a gesture sensor is provided for the operator action of the user and at least one virtual surface, which is used to distinguish between the different depth planes, is provided in the transportation vehicle interior, wherein the gesture sensor is used to detect whether all or a part of the user's hand is located in front of or behind the virtual surface.

14. The device of claim 13, wherein a stereoscopic display is provided as the display device, to which the virtual surface is assigned in the case of the 2-D zero plane of the stereoscopic display, wherein an interaction takes place with a control element appearing behind the surface of the stereoscopic display in response to detection of all or part of the user's hand in the spatial region between the virtual surface and the surface of the stereoscopic display, and an interaction takes place with a control element appearing in front of the surface of the stereoscopic display in response to detection of all or part of the user's hand in the spatial region in front of the virtual surface.

15. The device of claim 10, wherein control elements are provided on the steering wheel for the operator action of the user.

16. The device of claim 10, wherein both a touch screen and a gesture sensor are provided for the operator action of the user, wherein one part of the operator action is performed using the touch screen and another part is performed by the gesture sensor.

17. The device of claim 10, wherein a visual and/or haptic feedback signals the current depth plane and the current position within the depth plane.

18. The device of claim 10, wherein the image contents comprises three-dimensional control elements for user interaction to adjust the associated operation control.

19. A transportation vehicle having a device for carrying out a method for interacting with image contents displayed on a display device in a transportation vehicle, the method comprising:
displaying image contents with a spatial impression of depth by at least two depth planes, wherein the image contents comprise control elements each associated with an operation control, wherein at least one control element is displayed for user interaction within each of the at least two depth planes;
detecting an operator action of a user by at least one sensor provided in the transportation vehicle;
determining, based on the detected operator action, which of the at least two depth planes corresponds to the operator action; and
adjusting, within the determined depth plane, the associated operational control of a corresponding one of the displayed control elements shown based on the detected operator action.

20. The device of claim 19, wherein the image contents comprises three-dimensional control elements for user interaction to adjust the associated operation control.

* * * * *